United States Patent [19]

Bello

[11] Patent Number: 5,223,756
[45] Date of Patent: Jun. 29, 1993

[54] SELF-ALIGNING MOTOR ASSEMBLY

[75] Inventor: Peter Bello, Haledon, N.J.

[73] Assignee: GEC-Marconi Electronic Systems Corp., Wayne, N.J.

[21] Appl. No.: 30

[22] Filed: Jan. 4, 1993

[51] Int. Cl.$^5$ .............................................. H02K 7/08
[52] U.S. Cl. ........................................ 310/90; 310/42; 310/67 R; 384/510; 384/538; 384/585
[58] Field of Search ................. 310/90, 67 R, 42, 179, 310/162-165, 105, 254, 261; 384/510, 537, 538, 571, 585

[56] References Cited

U.S. PATENT DOCUMENTS

| | | | |
|---|---|---|---|
| 2,554,957 | 5/1951 | Riblet | 384/571 |
| 4,585,963 | 4/1986 | Wilkinson, Jr. et al. | 310/42 |
| 4,943,748 | 7/1990 | Shiozawa | 310/67 R |
| 5,058,262 | 10/1991 | Brockmuller et al. | 384/571 |

Primary Examiner—R. Skudy
Attorney, Agent, or Firm—David L. Davis

[57] ABSTRACT

A self-aligning motor assembly wherein the bearings between the rotor and stator subassemblies, and their seats, are tapered to remove concentricity differences.

6 Claims, 2 Drawing Sheets

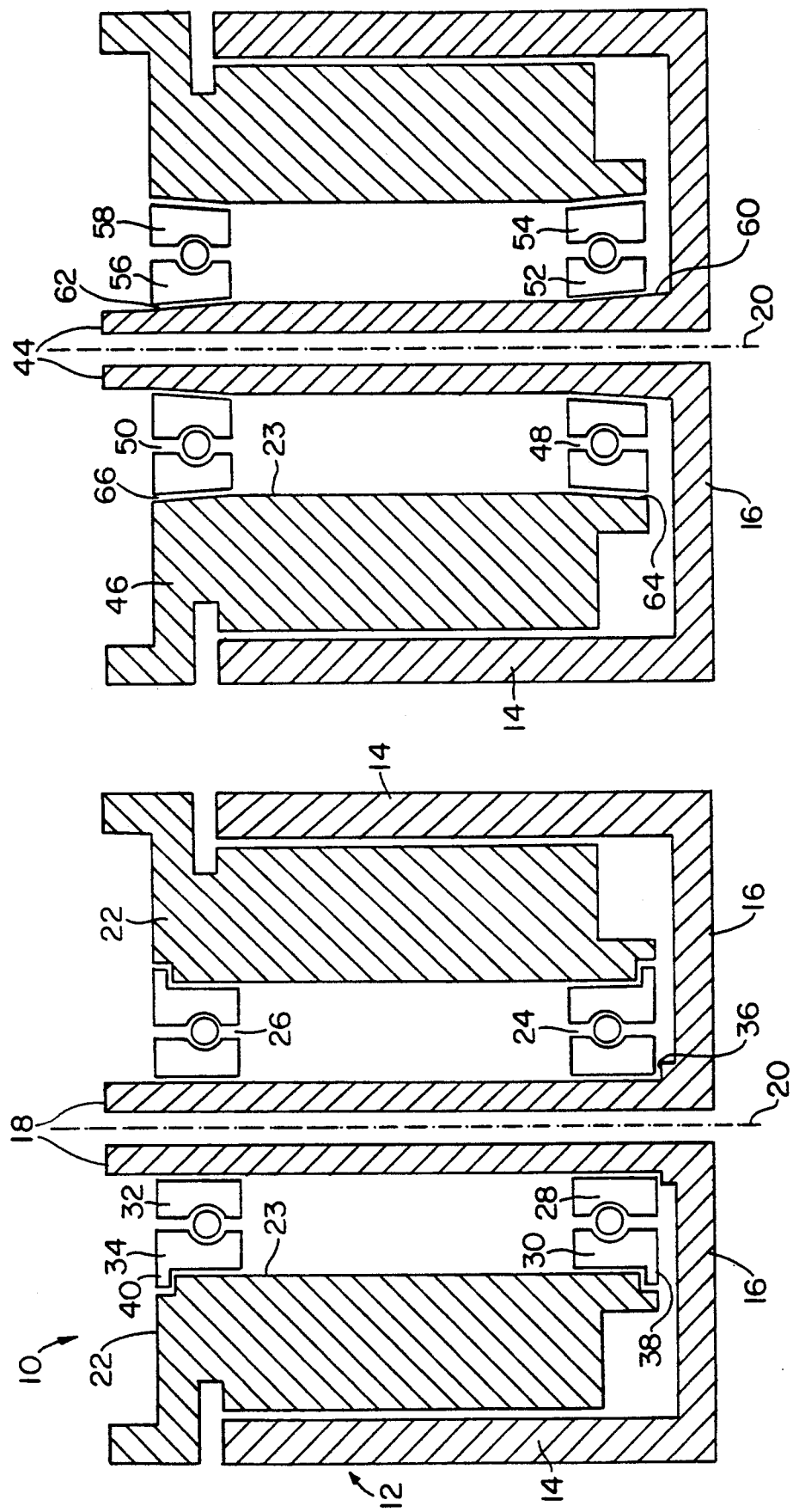

SELF-ALIGNING MOTOR ASSEMBLY

BACKGROUND OF THE INVENTION

This invention relates to motor assemblies and, more particularly, to such an assembly wherein the rotor subassembly is self-aligning with respect to the stator subassembly.

The MULTISENSOR angular rate sensing assembly manufactured and sold by GEC-Marconi Electronic Systems Corporation of Wayne, New Jersey, assignee of the present invention, utilizes a synchronous hysteresis motor (see FIG. 1) for spinning the gyroscopic element of the sensor assembly. It is critical to the proper operation of this device that the spin axis of the gyroscopic element be properly aligned so that output signal noise due to shaft wobble is minimized. This wobble is caused by misalignment between the inner diameter of the bearing inner races and the rotor shaft and misalignment between the outer diameter of the bearing outer races and the stator support, which causes elliptical orbits of the shaft with respect to the reference features of the MULTISENSOR angular rate sensing assembly which are fixed in inertial space.

It is therefore a primary object of the present invention to provide a motor assembly wherein the bearings, the rotor subassembly shaft and the stator subassembly are self-aligning.

SUMMARY OF THE INVENTION

The foregoing, and additional, objects are attained in accordance with the principles of this invention by tapering selected bearing seats on the stator subassembly and the shaft of the rotor subassembly.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 1 schematically depicts a cross sectional view of a prior art motor assembly of the type to which the present invention pertains;

FIG. 2 schematically depicts a modified version of the motor assembly of FIG. 1 incorporating a first illustrative embodiment of the present invention;

DETAILED DESCRIPTION

Figure 3:
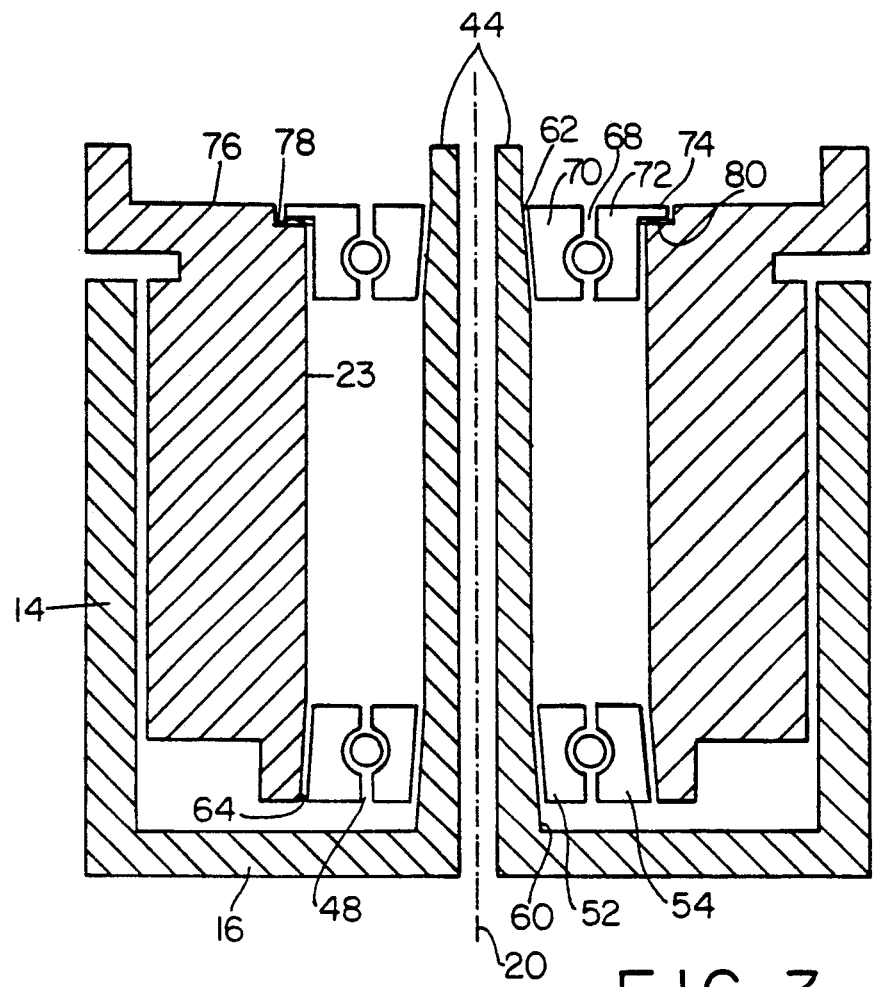
FIG. 3 schematically depicts a modified version of the motor assembly of FIG. 1 incorporating a second illustrative embodiment of the present invention.

FIG. 1 schematically depicts, in cross section, a prior art synchronous hysteresis motor assembly of the type to which the present invention pertains. This motor assembly, designated generally by the reference numeral 10, includes a generally cup-shaped rotor subassembly 12 which has a cylindrical outer shell 14, an end wall 16 affixed to a first end of the outer shell 14, and a bearing shaft 18 concentric with the outer shell 14. The bearing shaft 18, which is illustratively hollow, is affixed to the end wall 16 and extends toward the other end of the outer shell 14. The bearing shaft 18 has a central longitudinal axis 20 which defines the axis of rotation of the motor, and in turn the spin axis of the gyroscopic element (not shown) of the angular rate sensor, which gyroscopic element is mounted to the end wall 16. As is conventional, the rotor subassembly 12 has a plurality of laminations secured to the outer shell 14.

The motor assembly 10 further includes a generally cylindrical stator subassembly 22 which includes stator windings. The stator subassembly 22 is disposed within the rotor subassembly 12, as shown in FIG. 1, and is formed with a central bore 23 which has an axis colinear with the axis 20 of the bearing shaft 18. The bore 23 is sized to freely accept the bearing shaft 18 therein. To secure the rotor subassembly 12 to the stator subassembly 22 for relative rotation therebetween about the axis 20, there is provided a lower bearing 24 and an upper bearing 26. The lower bearing 24 has an inner race 28 secured to the bearing shaft 18 and an outer race 30 secured to the stator subassembly 22. Similarly, the upper bearing 26 has an inner race 32 secured to the bearing shaft 18 and an outer race 34 secured to the stator subassembly 22. The bearing shaft 18 is formed with a shoulder 36 to locate the inner race 28 of the lower bearing 24 and the outer race 30 of the lower bearing 24 is formed with an outwardly extending flange 38 to locate the stator subassembly 22. The outer race 34 of the upper bearing 26 is formed with an outwardly extending flange 40 to locate the upper bearing 26 on the stator subassembly 22.

For assembling the motor assembly 10, the lower bearing 24 is placed over the bearing shaft 18 and lowered into engagement with the shoulder 36 after cement has been applied to the bearing shaft 18 in the region where the inner race 28 is seated. Cement (not shown) is applied to the outer race 30 of the lower bearing 24 and the stator subassembly is then put into place. Finally, the upper bearing 26 is installed, with cement applied to where it engages the stator subassembly 22 and the bearing shaft 18. A load is then applied to the upper bearing 26 in a direction toward the end wall 16 while the cement is curing.

A problem with the arrangement shown in FIG. 1 is that if the bearings 24, 26 are not properly centered on the bearing shaft 18, or within the stator subassembly 22, the bearing shaft 18 will have an elliptical orbit, which causes excessive output signal noise. This can occur even with very high tolerances, because there must still be some clearance between the outer diameter of the bearing shaft 18 and the inner diameters of the races 28 and 32. This clearance is filled with cement, the thickness of which may not be uniform when going around the axis 20.

FIG. 2 shows a first embodiment of the invention which overcomes the above-described concentricity problem by providing the bearing shaft and stator subassembly with cone-shaped bearing seats and providing matching cone-shaped bearing races. Thus, as shown in FIG. 2, the laminated rotor subassembly includes the cylindrical shell 14 and the end wall 16, as well as a modified bearing shaft 44. The motor assembly also includes, a modified stator subassembly 46 with windings (not shown), a lower bearing 48, and an upper bearing 50. The lower bearing 48 includes an inner race 52 and an outer race 54, and the upper bearing 50 includes an inner race 56 and an outer race 58. The bearing shaft 44 is formed so that the seat 60 for the inner race 52 of the lower bearing 48 is tapered outwardly toward the end wall 16 and is further formed so that the seat 62 for the inner race 56 of the upper bearing 50 is likewise tapered outwardly toward the end wall 16. Similarly, the stator subassembly 46 is formed so that the seat 64 for the outer race 54 of the lower bearing 48 is tapered outwardly toward the end wall 16 and the seat 66 for the outer race 48 and the upper bearing 50 is tapered outwardly away from the end wall 16. The races 52, 54, 56 and 58 are each tapered to mate with their respective seats 60, 64, 62 and 66, as shown in FIG. 2.

To assemble the arrangement shown in FIG. 2, cement (not shown) is applied to the seat 60 and the lower bearing 48 is placed thereover, and pressed firmly. Cement is then applied to the outer race 54 of the lower bearing 48 and the stator subassembly 46 is put in place with the seat 64 over the outer race 54. Cement is then applied to the seats 62 and 66 and the upper bearing 50 is put in place and a load is applied thereto. The load on the upper bearing 50 is transferred to the stator subassembly 4 and then to the lower bearing 48 so that the bearings 48 and 50 are firmly seated, removing any lack of concentricity of the bearings 48 and 50 and the stator subassembly 46 relative to the axis 20. The cement is cured while the load is applied to the upper bearing 50.

Figure 4:
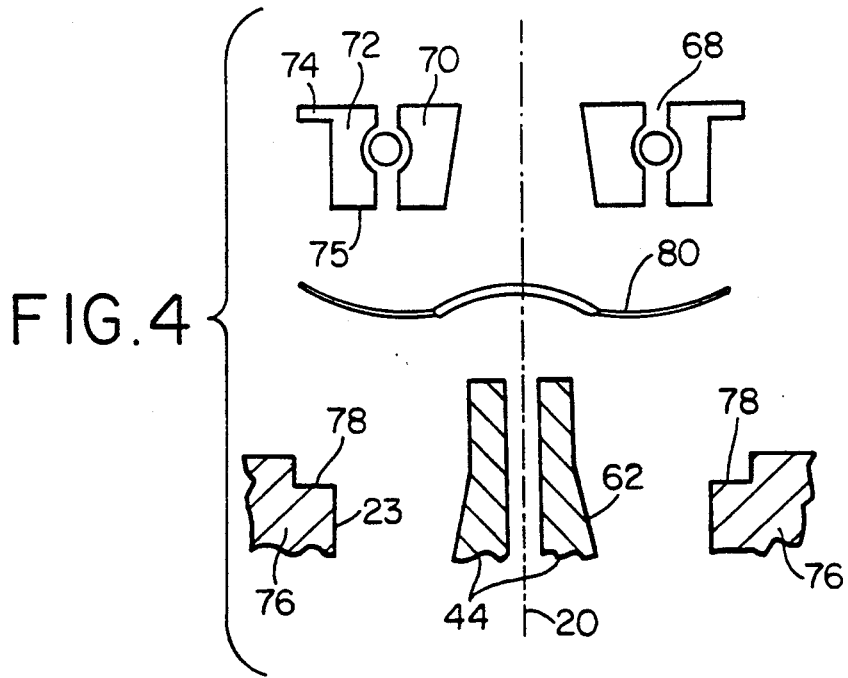
FIG. 4 is an enlarged exploded detail showing a portion of the assembly of FIG. 3.

FIGS. 3 and 4 illustrate a second embodiment of this invention. This second embodiment is similar to the embodiment shown in FIG. 2, with the difference being related to the upper bearing 68. As shown in FIGS. 3 and 4, the inner race 70 is the same as the upper bearing inner race 56 (FIG. 2) with the same taper so as to seat properly on the tapered seat 62. However, the outer race 72 is formed with a flange 74. The flange 74 is spaced from the end 75 of the race 72 which is closest to the end wall 16 and extends outwardly beyond the inner wall of the central bore 23 of the stator subassembly 76. The stator subassembly 76 is formed with a shoulder 78 which acts as a seat for the flange 74. The outer race 72 is cylindrical between the flange 74 and its end 75, and the central bore 23 is likewise cylindrical in the region below the shoulder 78 with a diameter sized to provide a close fit with the cylindrical region of the outer race 72. Additionally, a wave washer 80 is provided which surrounds the bearing shaft 44 and the cylindrical region of the outer race 72, the wave washer 80 being interposed between the flange 74 and the shoulder 78. The wave washer 80 provides a preload to the stator subassembly 76 and, through the stator subassembly 76, to the lower bearing 48. It is noted that, although a wave washer is illustrated, other preloading arrangements are possible.

To assemble the arrangement illustrated in FIGS. 3 and 4, cement is applied to the seat 60 and the bearing 48 is put in place and pressed firmly. Cement (not shown) is then applied to the seat 64 and the cylindrical region of the central bore 23 which seats against the outer race 72. The stator subassembly 76 is then put in place and pressed firmly against the lower bearing 48. Cement (not shown) is applied to the seat 62 and the wave washer 80 is put in place on the shoulder 78. Finally, the upper bearing 68 is installed and a load is applied thereto. The cement is then allowed to cure while the load is applied to the bearing 68. The load applied to the inner race 70 is transmitted through the flange 74, to the wave washer 80, to the shoulder 78, to the seat 64, to the lower bearing 48, to the seat 60. The wave washer 80 insures that such preload is transmitted even if the axial dimensions of the parts leave some clearance between the flange 74 and the shoulder 78, to insure that the tapered seats remove shaft eccentricities which arise from non-uniform radial clearances.

Accordingly, there has been disclosed an improved self-aligning motor assembly. While illustrative embodiments of the present invention have been disclosed herein, it is understood that various modifications and adaptations to the disclosed embodiments will be apparent to those of ordinary skill in the art and it is only intended that this invention be limited by the scope of the appended claims.

I claim:

1. A motor assembly comprising:
   a generally cup-shaped rotor subassembly having a cylindrical outer shell, an end wall affixed to a first end of said outer shell and a bearing shaft concentric with said outer shell, said bearing shaft being affixed to said end wall, extending toward the other end of said outer shell, and having a longitudinal central axis defining an axis of rotation of the motor, said rotor subassembly further including a plurality of laminations secured to said outer shell;
   a generally cylindrical stator subassembly including stator windings, said stator subassembly being disposed within said rotor subassembly and being formed with a central bore having an axis colinear with the axis of the bearing shaft, said central bore being sized to freely accept the bearing shaft therein;
   a first bearing having an inner race and an outer race, said first bearing being adapted for installation between said bearing shaft and said stator subassembly within said central bore and adjacent said end wall; and
   a second bearing having an inner race and an outer race, said second bearing being adapted for installation between said bearing shaft and said stator subassembly within said central bore and remote from said first bearing;
   CHARACTERIZED IN THAT:
   a bearing shaft seat for said first bearing inner race is tapered outwardly toward said end wall;
   a stator subassembly seat for said first bearing outer race is tapered outwardly toward said end wall;
   the inner and outer races of said first bearing are tapered to mate with the bearing shaft seat for the first bearing inner race and the stator subassembly seat for the first bearing outer race, respectively;
   the bearing shaft seat for said second bearing inner race is tapered outwardly toward said end wall; and
   the inner race of said second bearing is tapered to mate with the bearing shaft seat for the second bearing inner race.

2. The motor assembly according to claim 1 further CHARACTERIZED IN THAT:
   the second bearing outer race includes a flange spaced from its end which is closest to said end wall and extending outwardly beyond the inner wall of said stator subassembly central bore; and
   the stator subassembly is formed with a seat for supporting said second bearing outer race flange.

3. The motor assembly according to claim 2 further CHARACTERIZED IN THAT:
   the second bearing outer race is cylindrical with a predetermined diameter in a region between the flange and its end closest to the end wall; and
   the central bore of the stator subassembly is cylindrical in the region adjacent the second bearing outer race flange supporting seat toward said end wall and with a diameter sized to provide a close fit with the cylindrical region of the second bearing outer race.

4. The motor assembly according to claim 3 further CHARACTERIZED IN THAT:

the first and second bearing inner and outer races are cemented to the respective bearing shaft and the stator subassembly seats, and there is further provided means interposed between the second bearing outer race flange and the second bearing outer race flange support seat for applying a loading force to the stator subassembly in a direction toward said end wall.

5. The motor assembly according to claim 4 further CHARACTERIZED IN THAT:

the loading force providing means includes a wave washer surrounding the bearing shaft and the cylindrical region of the second bearing outer race.

6. The motor assembly according to claim 1 further CHARACTERIZED IN THAT:

the stator subassembly seat for said second bearing outer race is tapered outwardly away from said end wall; and the outer race of said second bearing is tapered to mate with the stator subassembly seat for the second bearing outer race.

* * * * *